UNITED STATES PATENT OFFICE.

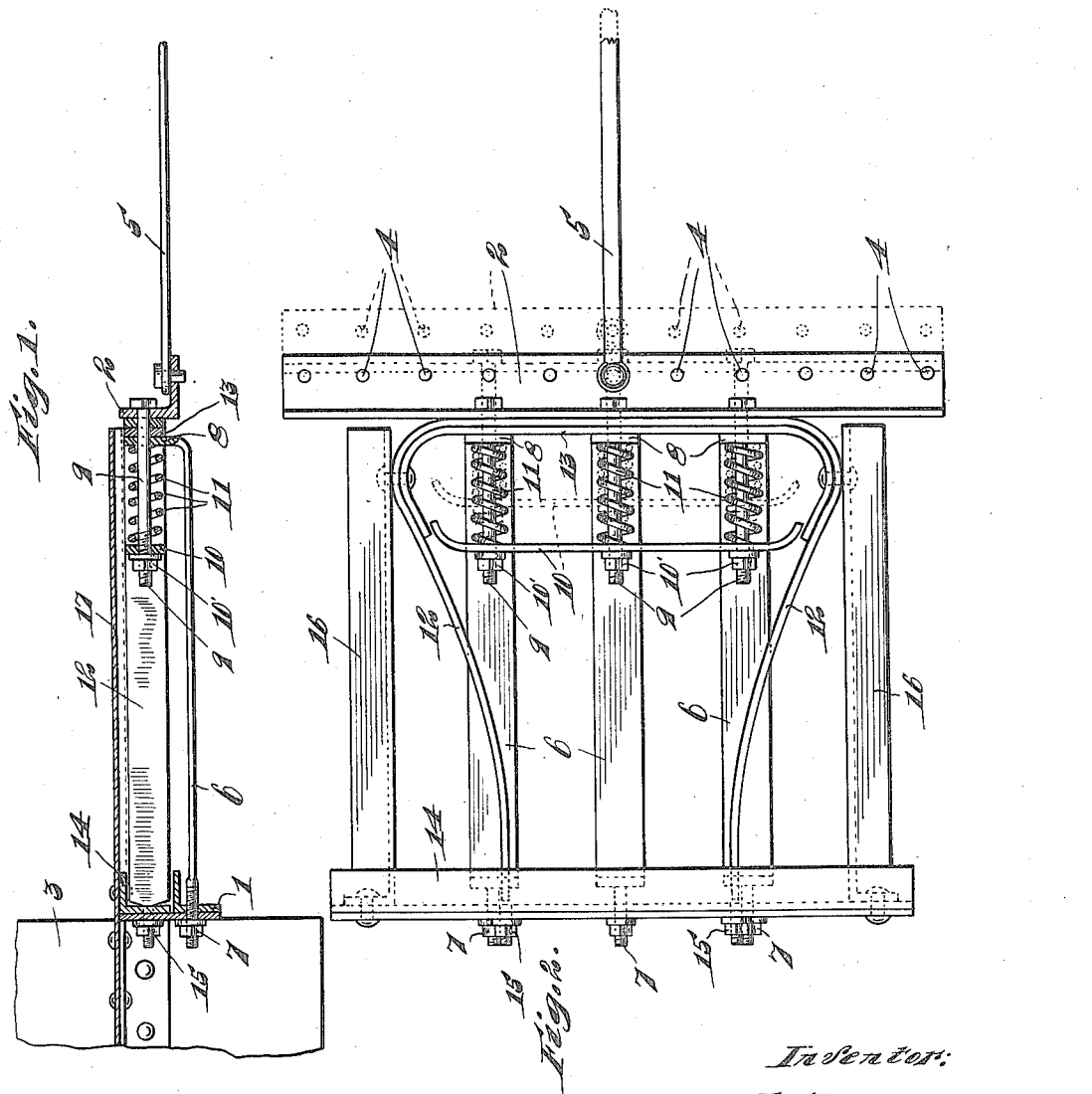

WILLIAM FRANKLYN TYRRELL, OF MAPLE PARK, ILLINOIS, ASSIGNOR OF ONE-HALF TO GEORGE F. STAFFORD, OF MAPLE PARK, ILLINOIS.

SPRING-HITCH.

1,188,119.  Specification of Letters Patent.  Patented June 20, 1916.

Application filed December 14, 1915. Serial No. 66,847.

*To all whom it may concern:*

Be it known that I, WILLIAM FRANKLYN TYRRELL, a citizen of the United States, and a resident of Maple Park, county of Kane, and State of Illinois, have invented certain new and useful Improvements in Spring-Hitches, of which the following is a specification.

My invention relates to spring hitches and more specifically to a device of this character especially desired for use in the connection of a tractor with a plow, pulverizer, or other machinery desired.

The object of my invention is the production of a device of the character mentioned through the medium of which a tractor may be yieldingly connected with the device to be drawn and in such a manner as to allow for ready turning to the right or left as well as backing up.

A further object is the production of a spring hitch which will be of durable and economical construction and efficient in use.

Other objects will appear hereinafter.

The invention consists in the combinations and arrangements of parts hereinafter described and claimed.

The invention will be best understood by reference to the accompanying drawing, forming a part of this specification, and in which—

Figure 1 is a vertical longitudinal section through a spring hitch embodying the invention showing the arrangement of the same when in use, and Fig. 2 is a top plan view of the construction shown in Fig. 1, except that the platform has been removed in order to expose underlying parts.

The preferred form of construction as illustrated in the drawing comprises two spaced parallel angle bars 1 and 2, the former of which is adapted, when in use, to be rigidly fastened to the rearward end of the tractor 3 in conjunction with which the device is employed. The bar 2 is provided with a plurality of spaced perforations 4 which afford means of connection therewith of the equalizer or other connecting element 5 of the machine to be drawn.

Extending rearwardly from the bar 1 is a plurality of spaced parallel bars 6, the forward ends of which are cylindrically formed and threaded and the same pass loosely through spaced openings provided for the reception thereof in said bar 1 and the adjacent portion of the tractor. Nuts 7 are threaded upon the forward ends of bars 6 serving to fasten the same to the bar or the adjacent portion of the tractor. The rearward ends 8 of the bar 6 are bent upwardly and through the same pass loosely the rearward ends of elongated bolts 9 which project rearwardly from the bar 2. Loosely mounted upon the forward ends of bolts 9 is a yoke 10 adjustably held in position by means of nuts 10' threaded upon said bolts 9. Interposed between the yoke 10 and the ends 8 of bar 6 are helical compression springs 11, the arrangement being such as will be seen that said springs serve to resist relative outward or separating movement of the parts 1 and 2 and hence therefore serve to lend yieldability or resiliency to the connection between the tractor and the device to which the same is coupled. The connection is such also as will be seen as to permit of ready turning of the tractor to the right or left as well as backing up without disturbing the operative relation of the parts. The tension of the springs 11 may be adjusted through adjustment of the nuts 10' in order to secure the desired yieldability in the hitch when in use.

In order to adapt the hitch for the support of a platform at the rearward end of the tractor a supplemental frame is provided comprising a substantially U-shaped frame member 12 the rearward or bight portion of which loosely engages with the bolts 9 behind the springs 11. A reinforcing bar 13 is provided at this portion of the frame member 12 to lend strength and rigidity thereto. The extremities of the frame member 12 pass through an angle iron bar 14 arranged above the bar 1, being connected thereto or to an adjacent portion of the tractor by means of nuts 15 which are threaded upon the reduced threaded extremities of said frame member. The ends of bar 14 are rigidly connected with the sides of frame member 12 adjacent the rearward end thereof by means of bars 16, the supplemental frame thus formed being adapted to support the platform 17 which may be secured thereto as desired.

While I have illustrated and described the preferred form of construction for carrying my invention into effect, this is capable of variation and modification without departing from the spirit of the invention. I, therefore do not wish to be limited to the precise details of construction set forth, but desire to avail myself of such variations and modifications as come within the scope of the appended claims.

Having described my invention what I claim as new and desire to secure by Letters Patent is:

1. A device of the class described comprising two spaced parallel bars, one of which is adapted for connection with the tractor and the other with the device to be drawn; elongated members projecting from one of said members having their outer ends vertically disposed and engaging against the adjacent side of the other; elongated members fastened to the last mentioned bar and passing loosely through the ends of said first mentioned members; and helical compression springs arranged on said second mentioned members engaging against said ends of said first mentioned members and adapted to resist relative outward movement of said elements, substantially as described.

2. A device of the class described comprising two spaced parallel bars, one of which is adapted for connection with the tractor and the other with the device to be drawn; elongated members projecting from one of said members having their outer ends vertically disposed and engaging against the adjacent side of the other; elongated members fastened to the last mentioned bar and passing loosely through the ends of said first mentioned members; a yoke extending between and loosely mounted on the outer ends of said second mentioned members; stops adjustably mounted on said second mentioned members against which said yoke engages; and springs on said second mentioned members interposed between said yoke and said ends of said first mentioned members adapted to resist relative outward movement of said elements, substantially as described.

3. A device of the class described comprising two spaced parallel bars, one of which is adapted for connection with the tractor and the other with the device to be drawn; elongated members projecting from one of said members having their outer ends vertically disposed and engaging against the adjacent side of the other; elongated members fastened to the last mentioned bar and passing loosely through the ends of said first mentioned members; helical compression springs arranged on said second mentioned members engaging against said ends of said first mentioned members and adapted to resist relative outward movement of said elements; and a platform supporting frame adapted for engagement at one end with the tractor and having its opposite end adapted for engagement behind said springs, substantially as described.

In testimony whereof I have signed my name to this specification in the presence of two subscribing witnesses.

WILLIAM FRANKLYN TYRRELL.

Witnesses:
ARTHUR L. STARK,
F. C. AHERN.